3,294,796
TRIS-2-MESYLOXYETHYL ISOCYANURATE

Bing T. Poon, Colonial Heights, Va., assignor to Allied Chemical Corporation, New York, N.Y., a corporation of New York
No Drawing. Filed Oct. 24, 1963, Ser. No. 318,498
1 Claim. (Cl. 260—248)

This invention is directed to a novel compound, tris-2-mesyloxyethyl isocyanurate, and to a process for its preparation.

Tris-2-mesyloxyethyl isocyanurate has the following structural formula:

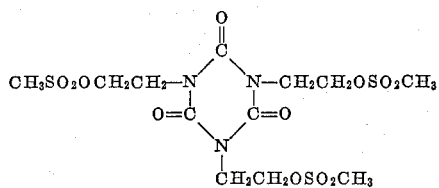

Tris-2-mesyloxyethyl isocyanurate can be prepared by reacting tris-2-hydroxyethyl isocyanurate with mesyl chloride (methanesulfonyl chloride) in the presence of a solvent and hydrogen chloride acceptor and recovering the tris-2-mesyloxyethyl isocyanurate from the resulting reaction mass. The preparation of the tris-2-mesyloxyethyl isocyanurate may be represented by the following equation:

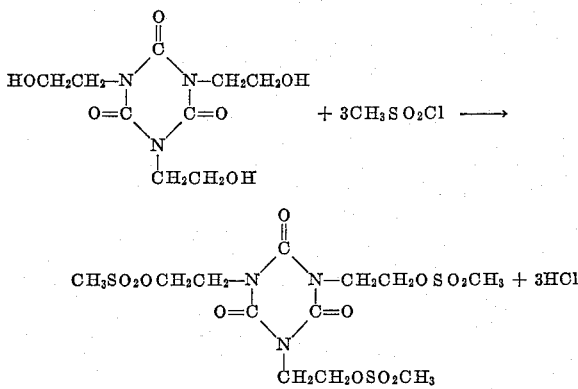

The mesyl chloride and tris-2-hydroxyethyl isocyanurate are preferably employed in ratio of about 3.0 to 3.3 mols of mesyl chloride per mol of tris-2-hydroxyethyl isocyanurate. Larger amounts of mesyl chloride may also be used, but no added advantage is attained thereby. The reaction may be effected at any temperature within the range of about −35° to 40° C. but is preferably carried out at temperature within the range of about −10° to 20° C.

It is essential to employ an inert solvent for the reactants which also acts as hydrogen chloride acceptor. Pyridine is the preferred solvent and hydrogen chloride acceptor. Simple liquid tertiary amines such as trimethyl, triethyl and tripropyl amines, and substituted pyridines such as the picolines and lutidines, may also be employed as solvent and hydrogen chloride acceptor. The amount of solvent-hydrogen chloride acceptor employed may vary widely, the minimum amount being that sufficient to completely dissolve the reactants.

The tris-2-mesyloxyethyl isocyanurate can be isolated from the reaction mass by any conventional procedure. For example, the reaction mass may be poured into ice water or chilled sodium bicarbonate solution to free solid material from adhering reaction medium. The product is then extracted from the solid material with a solvent therefor such as acetone, 1,4-dioxane and 1,3-dioxolane. Recovery of the product is finally attained by crystallization from a good solvent for the product such as 2-methoxyethanol, or from a mixture of an extraction solvent and a poor solvent such as methanol, ethyl acetate, chloroform, absolute ethanol, diethyl ether and toluene. The product has a melting point of about 136° to 138° C.

The tris-2-hydroxyethyl isocyanurate which is employed as starting material in the above process may be prepared by reacting cyanuric acid with ethylene oxide, as set forth in Little and Poon U.S.P. 3,088,948, issued May 7, 1963. This reaction is generally carried out using about 2 to 4 mols of ethylene oxide per mol of cyanuric acid at temperature of about 25° to 140° C., preferably at about 100° to 140° C., in the presence of inert solvent for the cyanuric acid and ethylene oxide, preferably a lower dialkylformamide such as dimethylformamide, and an alkaline catalyst such as sodium or potassium hydroxide.

Tris-2-mesyloxyethyl isocyanurate has been found to exhibit chemotherapeutic activity against cancer. Tris-2-mesyloxyethyl isocyanurate, when employed for chemotherapeutic purposes, can be combined with solid or liquid pharmaceutical carriers and formulated as tablets, powder packs or capsules using suitable excipients or dissolved or suspended in suitable vehicles for oral or parenteral adminstration.

The following example is illustrative of the product and process of the present invention. In the example, parts are by weight.

*Preparation of tris-2-hydroxyethyl isocyanurate*

A solution of 600 parts of cyanuric acid and about 2800 parts of dimethylformamide was heated to a temperature of 130° C. to 140° C. in a reaction vessel equipped with a stirrer, thermometer and Dry Ice reflux condenser. When the solution attained the desired temperature, 40 parts of potassium hydroxide were added. Then 600 parts of gaseous ethylene oxide were gradually introduced below the surface of the liquid at atmospheric pressure and at rate sufficient to maintain the temperature at 130° C. to 140° C. The ethylene oxide addition was completed in three hours. The reaction mass was cooled, and excess solid potassium hydroxide and by-product potassium salt of cyanuric acid were removed from the product solution by filtration. Excess dimethylformamide was removed by vacuum distillation at pot temperature of about 85° C. and pressure of about 12 to 18 mm. Hg to leave a viscous residue which crystallized upon cooling. The resultant crystalline material was recrystallized from ethanol, giving 779.5 parts of tris-2-hydroxyethyl isocyanurate.

*Preparation of tris-2-mesyloxyethyl isocyanurate*

A mixture of 105 parts of the tris-2-hydroxyethyl isocyanurate in 300 parts of pyridine was cooled to −8° C. in a reaction vessel equipped with a stirrer, thermometer, dropping funnel and drying tube. Next, 137 parts of mesyl chloride were added drop-wise over a 1-hour interval with the reaction temperature at −3° C. to −9° C. A 100-ml. portion of pyridine was added, and the slurry was allowed to warm at room temperature. Sodium bicarbonate powder was added, and the suspension was slowly poured onto 500 parts of chipped ice. The solid was filtered and extracted several times with acetone. On partial evaporation of acetone and crystallization from acetone-methanol, 150 parts of tris-2-mesyloxyethyl isocyanurate were obtained in a yield of 75%. This was recrystallized from acetone-methanol to give a product with a melting point of 136° C. to 138° C.

A sample of relatively pure tris-2-mesyloxyethyl isocyanurate gave the following analytical results for $C_{12}H_{21}N_3O_{12}S_3$.

Found: Carbon, 29.4%; hydrogen, 4.41%; nitrogen, 8.40%; sulfur, 19.19%. Theory: Carbon, 29.1%; hydrogen, 4.27%; nitrogen, 8.48%; sulfur 19.40%.

In chemotherapeutic tests, tris-2-mesyloxyethyl isocyanurate in saline medium was given by intraperitoneal administration to Fischer rats with the Dunning leukemia. A nearly 50% increase in like span was obtained using a daily dose of 600 mg. per kg. of rat weight.

Since various changes and modifications may be made in the invention without departing from the spirit thereof, the invention is deemed to be limited only by the scope of the appended claim.

I claim:
Tris-2-mesyloxyethyl isocyanurate.

References Cited by the Examiner

UNITED STATES PATENTS 3,088,948   5/1963   Little et al. _____ 260—248

OTHER REFERENCES

Fieser et al.: "Advanced Organic Chemistry," Reinhold Publishing Corp., New York (1961), pp. 698–9.

Kagen et al.: J.A.C.S. 81, 3026–31 (1959).

Ross et al.: J.A.C.S. 79, 2420–22 (1957).

WALTER A. MODANCE, *Primary Examiner.*

J. M. FORD, *Examiner.*